United States Patent

Cortner, Jr.

[11] 3,972,309
[45] Aug. 3, 1976

[54] END OPENING DUSTING BAG

[75] Inventor: William C. Cortner, Jr., St. Joseph, Mo.

[73] Assignee: Dale Alley Co., St. Joseph, Mo.

[22] Filed: Jan. 30, 1975

[21] Appl. No.: 545,752

[52] U.S. Cl. .............................................. 119/159
[51] Int. Cl.² ........................................ A01K 29/00
[58] Field of Search ............ 119/159; 24/204; 150/3

[56] References Cited
UNITED STATES PATENTS

| | | | |
|---|---|---|---|
| 3,696,472 | 10/1972 | Perina et al. | 24/204 |
| 3,777,716 | 12/1973 | Cortner, Jr. | 119/159 |
| 3,826,296 | 7/1974 | Morris | 150/3 |

*Primary Examiner*—Hugh R. Chamblee
*Attorney, Agent, or Firm*—Cushman, Darby & Cushman

[57] ABSTRACT

A self dusting cartridge loading protected livestock applicator comprising an inner porous bag having filling means and flexible protective material substantially surrounding and overly covering the bag. The flexible protective material extends below the inner porous bag forming folds which curl upward toward the bottom of the inner porous bag and preferably extend upward with a porous material that contacts and transfers dust from the inner bag to itself and to an animal. The applicator is constructed so that when it is agitated by an animal the guard or protective material cause dust to be dispensed on the agitating animal and at the same time provide some protection to the more vulnerable inner bag. The filling means is a reclosable fastener secured to an upper end portion of the bag which when opened permits immediate access to the inside of the inner porous storing and dusting bag and which when closed prevents substantial penetration by moisture into the bag.

31 Claims, 8 Drawing Figures

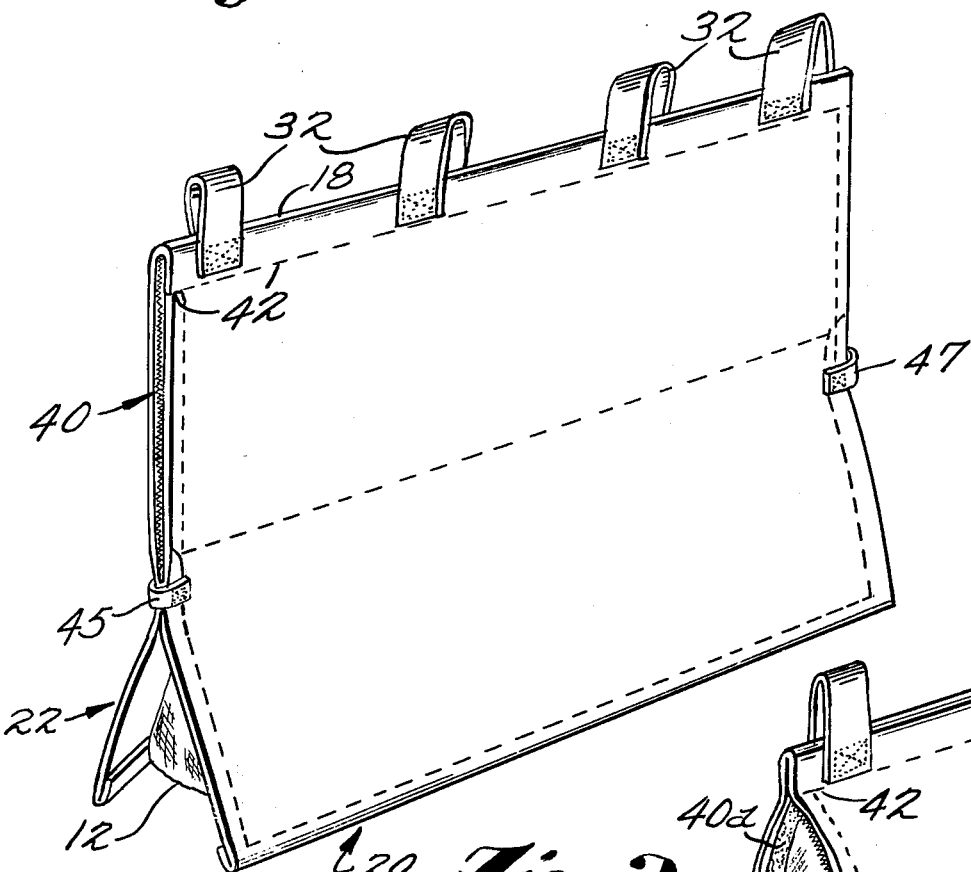
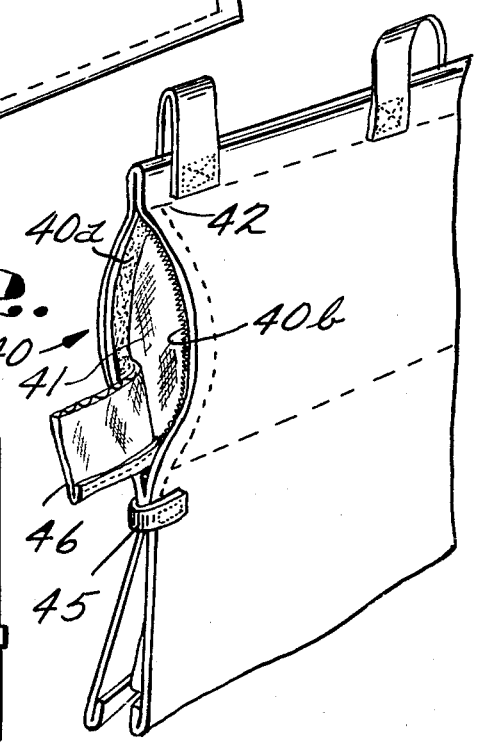
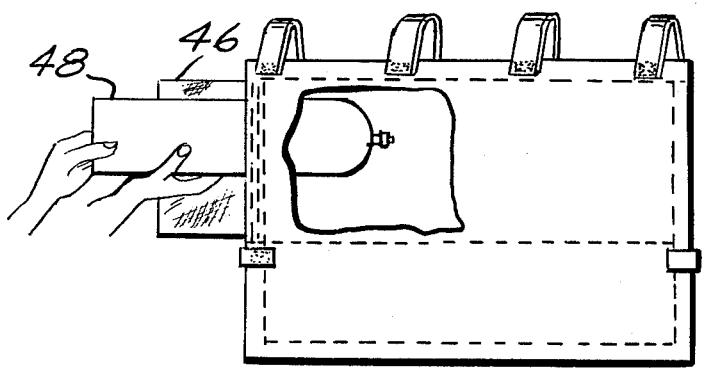
Fig. 1.
Fig. 2.
Fig. 3.

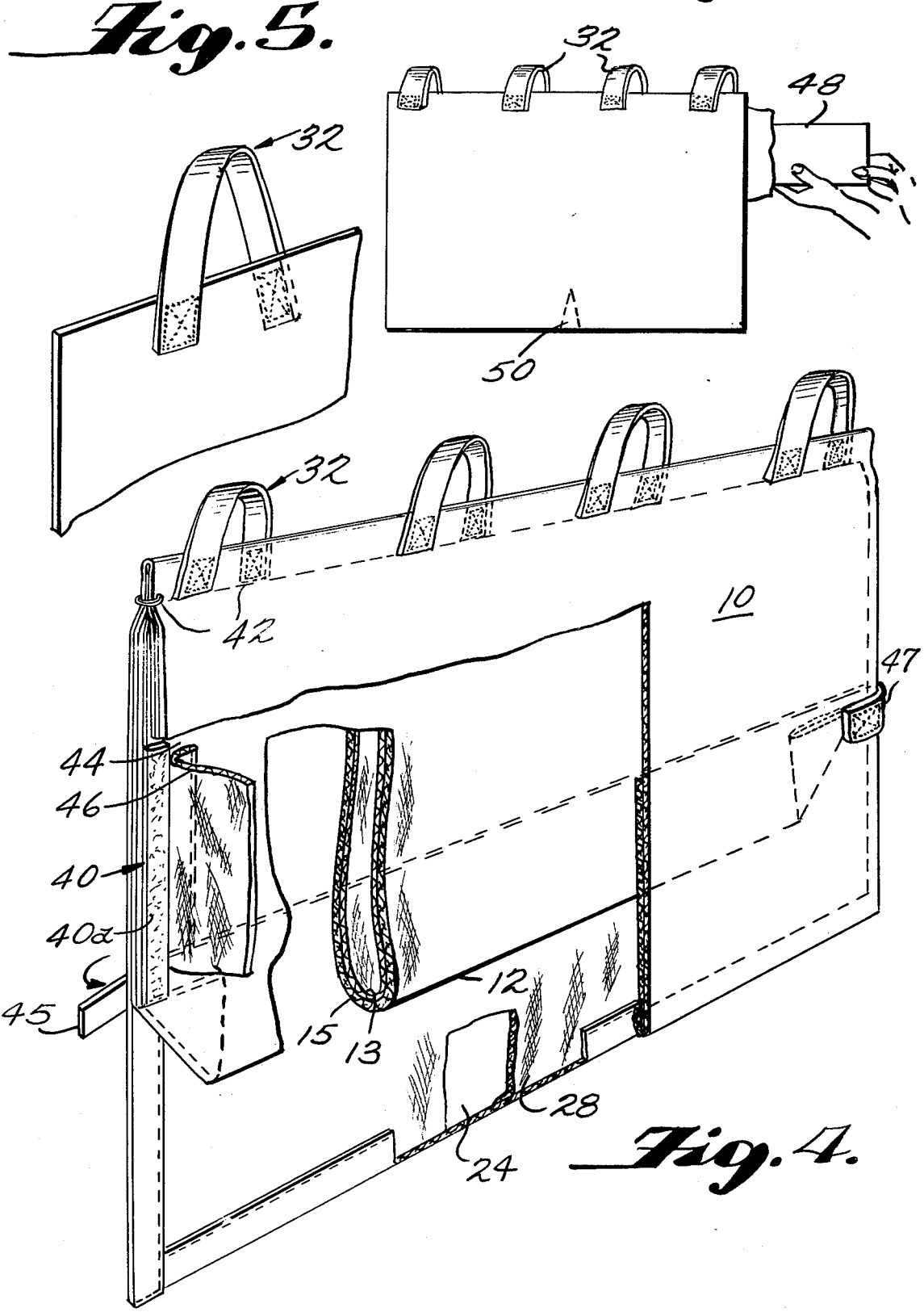

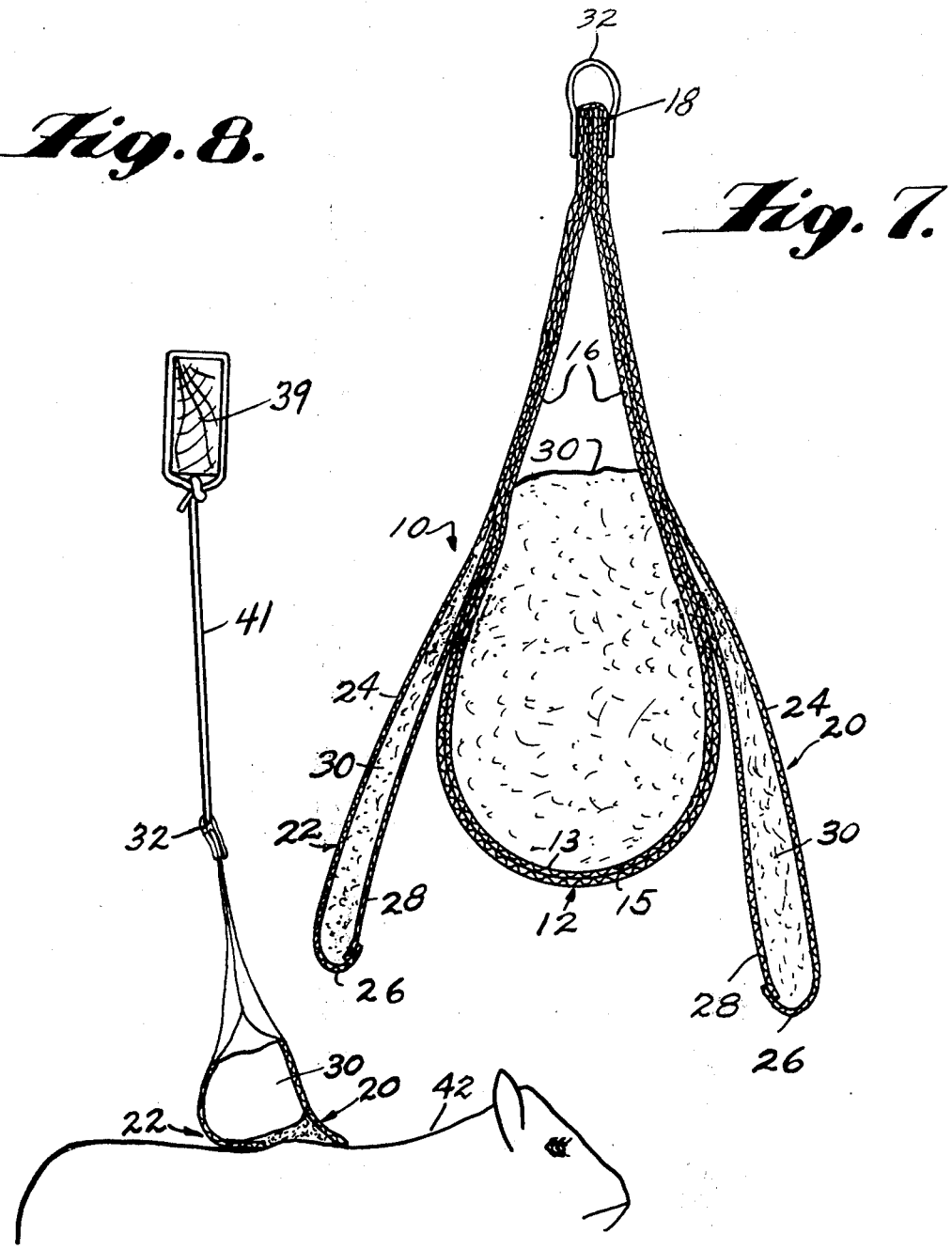

END OPENING DUSTING BAG

This invention relates to an applicator for dusting livestock with insecticide powders or dust as the animal passes beneath the applicator.

The present invention is an improvement over my dust applicators as disclosed in my application Ser. No. 110,575, filed Jan. 28, 1971, now U.S. Pat. No. 3,777,716, issued Dec. 11, 1973, and over my livestock dusting bag as disclosed in my application Ser. No. 422,341, filed Dec. 6, 1973 now U.S. Pat. No. 3,902,461, issued Sept. 2, 1975.

It is well known that livestock are frequently troubled with various types of insects, such as flies, ticks, lice, grubs, etc., which prey upon them causing irritation which results in interference of the animal's grazing and feeding. This interference can result in a loss of weight, decrease the milk production or impairment of the hide.

In the past, there have been ways this pest problem has been dealt with. One conventional way is to individually treat each animal by hand, which is an expensive method of treatment due to the individual cost of the labor involved. Additional treatments that have also been used are in the form of dust bags which are supported by various means. These dust bags are usually simple burlap-type bags, or other more sophisticated bags that use a waterproof flexible sheet, made for example of polyethylene or other poly-type materials, around the bag to protect them from moisture. The useful life of such bags has been limited due to the fact that the bag material has a tendency to easily become clogged with the dirt, saliva, feed and natural oils that accumulate on the bag when animals come into contact with them.

The invention in my aforesaid application and patent overcomes the prior art problem as does the present invention which includes some of the same features. Although this new end opening livestock dusting bag is an improvement over the prior bag disclosed in my above-referred to U.S. Pat. No. 3,777,716, sales of bags made in accordance with that patent have been very successful for the last several years.

All of my livestock dusting bags as disclosed in the above-referred to patent and application, as well as the present application, are improvements over previous dust applicators and each is constructed with an outer layer of heavy flexible material substantially encompassing and overly covering an inner porous bag so that the edges of the outer heavy flexible material extend down and under the inner porous bag forming folds. The fold arrangement acts as a protective guard in two ways.

1. It protects the more vulnerable inner dust carrying bag from the abuse of the cattle agitating the bag and also absorbs or collects much of the foreign matter from the cattle, preventing the foreign matter from plugging the pores in the dust carrying bag.

2. It offers protection of the inner dust carrying bag from the elements and due to the heavy outer cover, the inner dust carrying bag is in a sense hanging in deep shade and the sun's ultraviolet penetration is greatly reduced. This configuration also offers excellent protection from wind and moisture.

Preferably, the heavy flexible material forming an outer bag is lined in the inside from the bottom up for at least part of its height with the porous material for receiving and also applying dust to the using animal. This outer bag has the feature of exposing a greater dusting area when agitated.

The normal use of the present invention like those bags in my aforesaid patent and application lends itself to a longer servicable life than a conventional applicator or bag which comes into contact with moisture, dirt, and other clogging materials, as well as the ultraviolet rays of the sun, causing it to rot. Consequently, the improved construction and material composition enable it to be used longer than conventional dust bags. In fact, dust bags made according to the disclosure herein can be reused, as a refilling means is provided for the inner dust bag of the applicator which allows the user to conveniently refill the bag, thus lowering the cost per pound of dust dispensed.

The present invention disclosed herein that is unique over that in my aforesaid patent and application relates to a similar type of livestock dusting applicator but is provided with a unique means for refilling any of the types of bags disclosed therein, but in particular, is advantageous when used with the rectangular shaped bag generally as disclosed in my U.S. Pat. No. 3,777,716. The unique filling means of the present invention basically comprises the use of a "Velcro" or other type weatherproof closure or fastener on an upper end portion of the rectangular livestock dusting bag in place of the filler opening disclosed in the preferred embodiment of my U.S. Pat. No. 3,777,716. Such filling means may also be used in my cone-shaped bag disclosed in my above-mentioned copending application Ser. No. 422,341, if desired. In addition to using my filling means weatherproof fastener in this invention, it may also be advantageous to utilize a protective flap sewn internally in the bag extending into the inner porous storing and dusting bag to overlap the fastener so as to prevent possible clogging of the fastener due to some of the dust working its way into the fastener.

There are many objects and advantages to this new structure over my prior structures and over the prior art in my U.S. Pat. No. 3,777,716 as well as other prior art. These objects and advantages will become more apparent from the following detailed descriptions in connection with the accompanying drawings in which:

FIG. 1 shows in perspective the preferred embodiment of my end opening livestock dusting bag made in accordance with the present invention;

FIG. 2 shows a partial perspective view of the embodiment of FIG. 1 with the resealable refilling means of the present invention being opened and the protective flap being shown in partial cross section;

FIG. 3 shows the embodiment of FIG. 1 with the protective flap being pulled out and a refiller container full of dust being inserted into the inner porous storing and dusting bag;

FIG. 4 shows in perspective and partial cross section the embodiment of FIG. 1;

FIG. 5 illustrates a corner portion of the preferred embodiment of FIG. 1 showing the preferred strap means for suspending the bag;

FIG. 6 illustrates a modified embodiment of the present invention with a V void sewn in the lower portion of the inner bag to provide additional support therefor;

FIG. 7 shows an enlarged cross-sectional view of the self-dusting livestock applicator of FIG. 1 containing dust; and FIG. 8 shows partially diagrammatic and partially in cross section, the embodiment of FIG. 1, being agitated by an animal to release the dust upon the animal.

The preferred embodiment of my end opening livestock dusting bag 10 has an inner porous storing and dusting bag 12 comprising two porous plies or layers 13 and 15, for example tow layers of burlap, or both layers of porous plastic, or one inner layer 13 of burlap and an outer layer 15 of porous plastic. The outer layer is preferably full height as shown (see FIG. 7), or if it is made of plastic adhered to a full height inner layer it may cover only the lower half or so thereof but generally this does not provide the desired strength. The plastic material in any case is porous sufficiently to act as a dust sifter, for example a netting or woven material and preferably of the kind that is substantially non-stretchable so that it will not sag when filled with dust, for example 25 pounds of insecticide. The porous plastic is an organic thermoplastic polymer, for example, polyethylene, polypropylene, ethyleneproplyene copolymer, polyester (e.g., polyethylene terephthalate), saran (e.g., vinylidene chloride-vinyl chloride copolymer or venylidene chloride-acrylonitrile copolymer), nylon (e.g., nylon 6 or nylon 6,6), polyvinyl chloride or other vinyl chloride resin. Bag 12 is closed at both ends and its sides 16 extend upwardly toward each other to a closed top end 18. With this arrangement, several important advantages are obtained. First, the inner layer 13 of burlap carries little or no weight of the dust 14 since it is supported by the outer layer 15. Second, the burlap layer 13 or layer 15 does not come into contact with the saliva, feed, water, dirt, hair and oils or other foreign material from the cattle which ordinarily would result in clogging of the burlap layer as the outer guard flaps protect them.

The inner bag 12 is fully protected from weather by two guard flaps 20 and 22 on opposite sides of bag 12. As indicated in FIG. 7, these flaps not only fully cover both sides of bag 12 but also extend substantially beyond the opposite ends of the bag to effect a substantial cover of bag 12 all the way around. Flaps 20 and 22 includes an outer wall 24 which is of flexible material, for example, cloth, burlap if desired, covered with a suitable heavy flexible material. Outer wall 24 may likewise be made of waterproof canvas or duck (e.g., 8 oz.) material which is durable, rugged and can withstand the beating normally given it by livestock. Each outside wall extends considerably below the bottom of bag 12, for example, a distance about equal to one-half the maximum width of bag 12 when filled, and at its lower end curls inward and upward to make a U-shaped drip cap 26 for keeping moisture and foreign matter away from the inner bag 12. That is, any moisture on outer wall 24 runs down the wall and drips off at its lower end 26, thereby preventing moisture from coming into contact with bag 12 during use of the dust applicator 10 by wet livestock as shown in FIG. 8.

Flaps 20 and 22 preferably include an inner wall 28 forming each flap into an outer bag the ends of which are sewn shut or otherwise secured together and the interior of which can also contain insecticide dust 30, which may be transferred thereinto from bag 12. This transfer takes place if inner walls 28 are each made of porous material, such as burlap cloth, whereby transfer of dust from the inner storage bag 12 to the guard flaps or outer bags 20 and 22 takes place automatically upon contact between bag 12 and the inner walls 28 during use of applicator 10. Transfer may also be via grommets as more fully shown and described in my U.S. Pat. No. 3,777,716.

As more particularly shown in FIGS. 1 and 4, outer wall 24 also extends upwardly along side walls 16 of bag 12, and forms a protective top cover, with the inner and outer bag walls being secured together in any desired manner, as by several straps 32 that also provide the means for the complete assembly to be hung with a rope from an over head structure. These straps 32 are staggered in their attachment to opposite sides of the bag 10 as shown in FIG. 5, so that each single strap 32 offers two bearing points. In the case of four straps, as shown in FIG. 4, eight bearing points are effected and dispersement of weight is reduced per bearing point and the weight of the hanging bag is evenly spread the length of the protective top.

In operation, as shown in FIG. 8, dust applicator 10 is hung, for example, from a board 39 by ropes 41 to straps 32 so that the lower guard flap ends 26 are six to eight inches below the back line of the animal 42 to be dusted. As the animal passes under the applicator, contact is first made with the flexible outer side 24 of the leading flap 22, pushing the inner side 28 thereof against the inner bag 12 which contains the insecticide dust. This transfers dust into bag 22 via the pores in bag 12 and side wall 28 (if the latter is porous as is preferred). As the animal passes on under the applicator, contact is made with the inner wall 28 of the other guard flap or outer bag 20, and assuming that it has already been charged with dust, and since it hangs below the bottom of the inner bag 12, it drags across the head and back line of the animal, dusting as it passes. During this process, dust is also emitted from the inner bag 12 directly onto the animal.

In use, the combination of the exposed dusting area of the inner bag and the guard flap dusting walls 28 have a greater exposed dusting surface and consequently a greater efficiency and a better dusting potential, than a conventional bag, since the side flaps or bags of the present invention are constantly being charged and emitting dust along with the main bag 12. Dusting of an animal is also accomplished when it stands besides the bag and bucks and tosses it with its head. It will be realized that the arrangement of the dust bag of the present invention, as well as those disclosed in my prior patent and application referred to above, protects the bag 12 from much of the stress and wear resulting from animal contact since, as most blows from the animal's horns or head are usually directed upwardly, the guard flaps 20 and 22 will conform to the bottom side of the dust bag 12 and absorb the blows from the animals. Moreover, as shown in FIG. 8, when an animal passes under the dust bag, the leading guard flap first comes into contact with the animal and folds under the dust bag 12 to absorb most of the oil, dirt and other clogging materials and functions to keep the dust bag 12 out of contact with the animals.

Since the protection provided by this invention, and my previous ones referred to above, gives the applicator 10 a much longer serviceable life than a conventional bag that rots from moisture and the ultraviolet rays of the sun, refill provisions are desirable.

As more particularly shown in FIGS. 1 through 4, the novel resealable refilling means 40 of the present invention is preferably a Velcro fastener which is basically made of synthetic fibrous materials which adhere when pressed together, for example, see the early Velcro U.S. Pat. No. 2,717,437 to De Mestral and others such as U.S. Pat. Nos. 3,066,321 and 3,359,980. In its most common form, this usually amounts to two strips, one of which has a series of very small hooks and the other which has a series of very small loops (sometimes referred to as pile) both of which are formed from synthetic fibrous material. A strip of each of these, for example, ½ inch wide, contains either hooks or loops spaced across substantially the entire cross-section of the strip. When pressed together, the series of loops and hooks mesh together so as to form an interlocking weatherproof seal which may be easily reopened and then meshed back together many times without reducing the ability of the two strips to adhere together providing a seal.

In the present invention, it will be noted from FIG. 2 that the inner bag 12 and outer cover 24 have a common end opening 41 through which there can be ready manual access to the inside of bag 12 for filling purposes as later described. Both layers 13 and 15 of bag 12 and outer cover 24 have their front sides sewn together and their rear sides sewn together leaving opneing 41 extending from the upper stitching 42 and about ⅔ of the way down the edge to strap 45 which is double stitched all the way through from one outside cover to the other. One portion 40a of fastener 40 having either the hooks or loops, but for ease of description will be referred to as having hooks, is preferably sewn along the full height of the opening 41 on the inside of the upper edge portion of inner wall 44 of inner bag 12 all the way through to the outside cover. The other portion 40b of the fastener having loops is similarly sewn but along the full height of the opposite side of opening 41, to a corresponding portion of the opposing inner wall 46 of inner bag 12 all the way through to the adjacent outside cover 24. In this way the Velcro hooks and loops will be in meshing relationship when pressed together.

As above indicated, the opposing sides 40a and 40b of fastener 40 are secured not only to the inside walls of inner bag 12, but also to and through the respective outer walls 24. This provides for greater strength and of course the opening 41 in the inner bag 12 and outer cover will be opened and closed together by fastener 40. Also, a protective flap or dust guard 46 is preferably sewn to the inside of one of the inner walls of inner bag 12, for example, wall 44 as shown in FIG. 4, internally of the Velcro-type fastener 40, and which extends for the entire length of the fastener and opening produced thereby. Alternatively, dust guard 46 may be sewn only at its top along line 42 adjacent the top of opening 41. In either case, flap 46 may help guard against the insecticide dust from being butted by livestock into fastener 40, thereby helping to prevent filling of the female side of the fastener and the consequent reduction of its good fastening ability. Strengthening member 47 as well as the previously mentioned similar strap 45 are sewn to the outer walls 24 at the base of the opening in which fastener 40 is sewn so that the stitching in the bag at that point will not be pulled out due to opening of the fastener 40. Furthermore, strap 45 reduces the livestock butting strain which fastener 40 would otherwise experience.

The simplicity associated with the use of the Velcro type fastener over the filling means utilized in my previous livestock dusting bags as disclosed in the patent and application referred to above, is believed to be extremely advantageous and enhances the desirability and usefulness of livestock storing and dusting bags of that type.

Some of the advantages associated with the use of this particular type of filling means over those of my previous bags and other prioer art devices is that they are extremely easy to open and close and permit easy access to the inner storing and dusting bag 12 to insert a cartridge 48 therein since the outer guard flaps 20 and 22 need not be raised as with my previous bags. In addition, such a fastener provides excellent sealing capabilities for protection against the elements which protection is enhanced by the use of the protective flap 46 sewn internally of the Velcro fastener 40 to prevent the dust from working its way into the fastener and to prevent moisture or other undesirable elements from working into the fastener and combining with the dust to render the fastener inoperable. Furthermore, with the end opening bag of this invention, the weight of the dust 30 inside bag 12 pulls downward on the bag ends thereby causing the Velcro parts to be pulled automatically together continuously. The long vertical length of the Velcro reduces its per unit area of stress and strain from livestock butting as compared to the horizontal side opening Velcro arrangement in FIGS. 10–13 of my aforesaid application Ser. No. 422,341.

FIG. 3 shows one way to insert a cartridge 48 containing insecticide dust, through the opening produced by fastener 40, i.e., by first pulling guard 46 outward, but this is not essential and in fact would probably not be done by most users. Cartridge insertion can be accomplished easily when the bag 10 has been positioned in location. The dust applicator may be shipped with or without one or more insecticide cartridges. As shown in FIG. 3, the cartridge is initially inserted through the manually opened fastener 40. Then, as in my U.S. Pat. No. 3,777,716, once the cartridge is inside, the operator reaches through the opening and punctures or slits the cartridge or cartridges permitting the dust or insecticide to spill out into the porous inner bag 12. Dust guard or flap 46 is then preferably pulled to cover the inside of opening 41 which is then reclosed by fastener 40, and any following action by an animal bumping the bag will then cause the contents thereof to be dispensed during the self-dusting operation by the animal.

When more than one cartridge is used or when the bag is of a farily long width, for example 36 inches instead of 30 inches from end to end, and the inner bags 13 and 15 are both burlap, the middle bottom portion of bag 12 is preferably sewn in a manner to cause a inverted V void or hump 50 in its middle bottom as shown in FIG. 6, to remove weight from the center of the bag. This helps to eliminate sagging of the dust bag in the center causing the bottom to be more level.

It can be seen that an advantage of this type of filling means over those previous bags in the prior art, including my own, is that at the point of opening, the inner porous storing and dusting bag layers 13 and 14 are sewn to the outer cover on opposite sides of opening 41 behind the Velcro fasteners 40a and 40b; thus when the Velcro fastener is opened, the operator has immediate access to the inner porous storing and dusting bag. While the Velcro fastener above described is by far the presently preferred type of fastener, use may instead be made of other weatherproof fastening means including zippers (e.g. of nylon), mini-snaps every one-half inch or so, lacing, etc..

Thus it has been shown that all of the objects and advantages of this invention heretofore discussed have been carried forth by the construction and operation of the novel livestock dusting applicator above described. Further objects and advantages, and even other embodiment of this application will become apparent to those of ordinary skill in the art upon reading the foregoing disclosure. However, it is to be understood that such modifications and variations are considered to be within the purview and scope of the present invention as defined by the appended claims.

What is claimed is:

1. A protected self-dusting livestock dust applicator comprising:
   an inner porous storing and dusting bag,
   outer means of flexible material on each side of said inner bag secured with and extending below and covering said inner bag sufficiently to provide complete protection for keeping moisture and foreign matter away from said inner bag,
   said outer means being elongated bag means providing skirt means and including means for transferring dust from said inner bag to said outer bag means, said skirt means having an inner dispensing portion,
   said inner bag having an opening defined therein by upper edge portions on one end of said bag, said edge portions being secured to corresponding edge portions of said outer means defining an opening therein in alignment with said opening in said inner bag, and
   weatherproof resealable means disposed in said openings inside said bag and secured to said bag and outer means edge portions for opening said openings in said inner bag and outer means simultaneously so as to permit ready access to the inside of said inner bag for disposing said livestock dust in said inner bag and for automatically fully closing and for maintaing closed said openings simultaneously after a given amount of said dust is disposed therein for preventing substantial penetration of moisture to said inner bag when closed.

2. An applicator as defined in claim 1 wherein said resealable means comprises:
   two backing members respectively secured to said inner bag edge portions,
   a plurality of interlocking loops and hooks formed of synthetic fibers, the loops being mounted on one of said backing members and the hooks being mounted on the other backing member so as to be interengageable in a locking manner and being of sufficient quantity and so situated as to prevent penetration by substantial amounts of moisture into said inner bag.

3. An applicator as defined in claim 1 and further including protective flap means disposed at the inner edge of said inner bag opening and secured to said inner bag and being of sufficient length and width to overly cover said resealable means when closed for preventing dust contained within said inner bag from reaching said resealable means.

4. An applicator as in claim 1 wherein said transferring means includes said outer bag means having porous inner wall means.

5. An applicator as in claim 1 wherein said inner porous bag has an inner layer of woven burlap material and an outer layer of porous substantially nonstretchable plastic woven material.

6. An applicator as in claim 1 wherein said inner porous bag has an inner porous layer of full height and an outer porous layer of at least about half height.

7. An applicator as in claim 6, wherein the outer layer is of full height to help support the dust weight.

8. An applicator as in claim 6, wherein at least one of said inner bag layers is made of porous plastic material.

9. An applicator as in claim 8, wherein the inner layer of the inner bag is made of burlap.

10. An applicator as in claim 1, wherein said inner bag is two ply both of which are burlap.

11. An applicator as in claim 1, wherein said inner porous contains at least one insecticide cartridge.

12. An applicator as in claim 1, wherein said outer means has an exterior at least in its lower portions of heavy, flexible, weatherproof, cloth-like material that can withstand livestock abuse and protect said inner bag therefrom.

13. A protected self-dusting livestock dust applicator comprising:
    at least one inner porous storing and dusting bag having at least a bottom for dispensing dust and having a vertical dust filling opening extending from adjacent the top of said bag toward said bottom,
    outer means of flexible weatherproof material substantially overly covering said inner bag and secured therewith and providing skirt means extending substantially below the said bottom portion of said inner bag to allow substantial fold of said skirt means under said bag to provide protection to said inner bag from use by livestock including mishandling thereby and from foreign matter and moisture,
    said outer means including outer covering material having a vertical filling opening adjacent to and coinciding with said inner bag filling opening, and
    weatherproof vertically disposed Velcra closure means secured to said inner bag and outer covering material adjacent said openings for fully and automatically closing said inner bag through said filling openings after a given amount of dust is disposed therein for preventing substantial penetration of moisture to said inner bag when closed.

14. An applicator as in claim 13 in combination with at least one cartridge of said dust.

15. An applicator as in claim 13 including means secured to said outer means at the bottom end of its said filling opening for effectively limiting the length of said openings and for reducing livestock butting strain on said closure means.

16. An applicator as in claim 13, wherein said inner bag and outer means are generally rectangular in side view and said vertical openings and closure means therefor are in the upper two-thirds of one end thereof.

17. An applicator as in claim 16, wherein said filling opening in said inner bag is formed by opposing inside sides of said inner bag at said one end thereof and said outer means covering material includes open opposing sides at sid end forming its said filling opening which surrounds the inner bag filling opening and said closure means has opposite matable sides one of which is secured to one of said opposing sides of both said inner bag and covering material and the other of which is secured to the other of said opposing sides of both said inner bag and covering material.

18. An applicator as in claim 17, wherein said closure means matable sides are respective meshable Velcro strips which are secured flatwise on said opposing inside sides of said inner bag at said one end thereof.

19. An applicator as in claim 13, wherein said skirt means is comprised of outer guard flaps respectively positioned on opposite sides of said inner bag and having terminating separate ends extending beyond the ends of said inner bag.

20. A livestock dust applicator as in claim 13 and further including:
means for causing a hump in the central area of the bottom of said inner dusting bag to prevent central sag of said bag bottom when filled with said dust.

21. An applicator as in claim 13, wherein said inner porous bag has a plurality of layers.

22. An applicator as in claim 13, wherein said outer means includes at least a partial inner layer which is at least partially constructed of flexible porous material for receiving dust from said inner bag and assisting said inner bag in the application of dust to said livestock.

23. An applicator as in claim 13, wherein said inner bag includes means for preventing sagging of said inner bag when the latter contains said dust.

24. An applicator as in claim 13, wherein said inner porous bag has inner and outer layers at least one of which is constructed of porous plastic material.

25. An applicator as in claim 24, wherein said porous plastic material includes a woven organic thermoplastic polymer material.

26. An applicator as in claim 13, wherein said outer means of flexible waterproof material has an exterior at least in its skirt means portion of heavy flexible, weather-proof cloth-like material that can withstand livestock abuse and protect the inner bag therefrom.

27. An applicator as in claim 13, wherein said inner porous bag has two layers at least one of which is burlap.

28. An applicator as in claim 27, wherein both of said inner bag layers are burlap.

29. An applicator as defined in claim 13, and further including a protective flap means disposed at the inner edge of said inner bag opening and secured to said inner bag and being of sufficient length and width to overly cover said closure means when closed for preventing dust contained within said inner bag from clogging said closure means.

30. An applicator as defined in claim 13, wherein said closure means comprises:
a plurality of interlocking loops and hooks formed of synthetic fibers, the loops being mounted on a backing member secured to one edge of said inner bag adjacent the said filling opening thereof and the hooks being mounted on a separate backing member secured to another edge of said inner bag adjacent the opposite side of its said filling opening so as to be interengageable in a locking manner and being of sufficient quantity and so situated as to prevent penetration of moisture into said inner bag.

31. An applicator as defined in claim 30, and further including a protective flap means secured to one edge of said inner bag for substantially the entire length of said openings so as to have the remaining loose portion of said flap means extending inwardly of said closure means, said loose portion being of sufficient length and width to overly cover said closure means when closed for preventing dust contained within said inner bag from reaching said closure means.

* * * * *